US006205898B1

(12) United States Patent
Surina

(10) Patent No.: US 6,205,898 B1
(45) Date of Patent: Mar. 27, 2001

(54) ROTARY CUTOFF DEVICE AND METHOD

(75) Inventor: Michael Surina, Waterdown (CA)

(73) Assignee: Formtek, Inc., Westfield, MA (US)

( * ) Notice: Subject to any disclaimer, the term of this patent is extended or adjusted under 35 U.S.C. 154(b) by 0 days.

(21) Appl. No.: 09/180,516

(22) PCT Filed: May 9, 1997

(86) PCT No.: PCT/CA97/00316

§ 371 Date: Nov. 23, 1998

§ 102(e) Date: Nov. 23, 1998

(87) PCT Pub. No.: WO97/43097

PCT Pub. Date: Nov. 20, 1997

(30) Foreign Application Priority Data

May 10, 1996 (CA) .................................................. 2176282

(51) Int. Cl.$^7$ .................................................. B26D 5/20
(52) U.S. Cl. .................................. 83/76; 83/286; 83/287; 83/289; 83/293; 83/295; 83/343
(58) Field of Search .............................. 83/38, 343, 337, 83/295, 73, 284, 76, 286, 287, 289, 293

(56) References Cited

U.S. PATENT DOCUMENTS

| 1,948,139 | 2/1934 | Smitmans . | |
|---|---|---|---|
| 1,965,523 | 7/1934 | MacFarren . | |
| 2,445,174 | 7/1948 | Hannewald et al. . | |
| 2,469,526 | * 5/1949 | Sloat | 83/337 |
| 2,491,871 | * 12/1949 | Morgan | 83/337 |
| 3,247,744 | * 4/1966 | Huck et al. | 83/337 |
| 3,606,813 | 9/1971 | Hallden . | |
| 3,641,858 | 2/1972 | Tuschy et al. . | |
| 4,034,635 | * 7/1977 | Woolston | 83/38 |
| 4,380,943 | * 4/1983 | Evans | 83/76 X |
| 4,512,225 | * 4/1985 | Green | 83/76 X |
| 4,685,318 | 8/1987 | Ueda et al. . | |
| 5,042,344 | * 8/1991 | Columbo | 83/337 X |
| 5,207,138 | * 5/1993 | Sato et al. | 83/337 |
| 5,421,227 | 6/1995 | Röhrdanz et al. . | |
| 5,713,256 | * 2/1998 | Keeny | 83/38 X |

FOREIGN PATENT DOCUMENTS 678029   3/1951   (GB) .
107878   4/1965   (GB) .

* cited by examiner

Primary Examiner—M. Rachuba

(57) ABSTRACT

An apparatus for cutting a movable sheet of web material onto predetermined lengths including a pair of upper and lower cutoff rolls and a retractable cutoff blade. A slide mechanism is utilized to move in a direction transverse to the movement of the sheet of web material to selectively engage and disengage the cutoff blade.

9 Claims, 3 Drawing Sheets

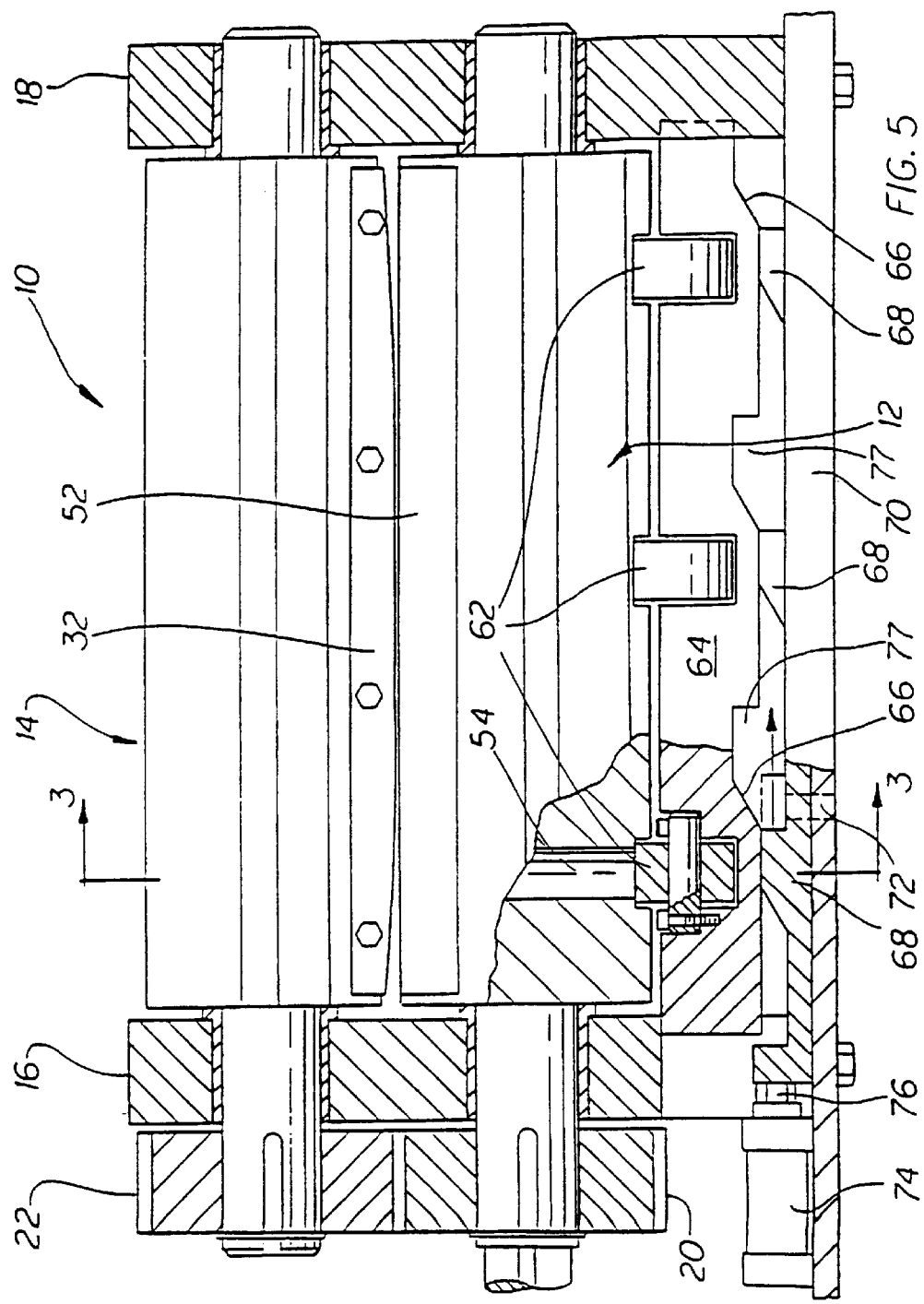

ROTARY CUTOFF DEVICE AND METHOD

TECHNICAL FIELD OF THE INVENTION

The invention relates to cutoff devices for strip material and, in particular, to a rotary cutoff device, which is adapted to permit the sheet web material to pass through the device, while the device is stationary and the shear device being operable intermittently to cut the web material at predetermined spaced locations.

BACKGROUND ART

The cutting of moving strip material has been carried out in a variety of ways. In one relatively primitive method, the moving strip was temporarily stopped at a point just before a shear blade, and the shear blade was operated. Upstream of the shear blade the strip continued to move and formed a loop. Once the shear blade opened, the strip was then allowed to pass forwardly again and the loop was removed. Other systems have involved pairs of upper and lower shears which were mounted on rails and could move forwardly and backwardly along the axis of the sheet material. By accelerating the upper and lower shear dies to the speed of the sheet material, the dies could then be closed, without stopping the sheet material. The dies would then be opened up and stopped and returned to their starting position for the next cut. These systems were effective but the mechanism was complex and expensive. It was also difficult to achieve a precise location for the position of each cut. In addition, cuts of less than a predetermined length could not be achieved at all due to the fact that the shear dies had to move forwardly and backwardly once during each cut.

U.S. Pat. No. 2,445,174 involved rotary blades which essentially chopped the web material at predetermined locations. However, controlling the length of cut on these rotary choppers was difficult, since the length of cut depended on upon the diameter of the chopper drum, and the speed of the web requiring changes in gears.

Clearly there is a need for a rotary cutoff device which is capable of cutting moving web sheet material at predetermined locations, the locations being adjusted and pre-settable, and being operable even at over relatively short distances between cuts, and involving a minimum of complex machinery.

DISCLOSURE OF THE INVENTION

With a view therefore to achieving the foregoing improvements, the invention comprises a rotary cutoff apparatus for use in conjunction with a moving sheet web material, for cutting the same into predetermined lengths, and comprising, a pair of lower and upper cutoff rolls, and gear means interlocking said rolls for rotary movement in unison, the rolls defining a gap therebetween for movement of the sheet web material therethrough, selectively operable means for operating said lower and upper rolls whereby to rotate the same in unison, a stop bar on one of said lower and upper rolls, defining a cutoff location and, a moveable cutoff blade-on the other of said lower and upper rolls, and means for moving said cutoff blade towards and away from said stop bar, said cutoff blade being offset slightly with respect to said bar whereby said cutoff blade moves adjacent said bar and achieves a shearing action.

The invention further provides that the moveable cutoff blade is connected to at least three plunger members extending through said other of said rolls, cam means on said plungers, and cam operating means located outside said roll in registration with said cam means, whereby upon rotation of said roll, said cam means engage said cam operating means and cause said plungers to advance said cutoff blade towards said stop bar.

The invention will also preferably provide that the cutoff rolls may be started and stopped by means of power operated means such as a motor or a clutch means, which is connected to a length measurement device located upstream of the cutoff apparatus, for measuring the length of the web material and for sending signals to the power operated means.

It is an advantage if the cutoff blade is mounted at a slight shear angle relative to the stop bar, so as to provide a cutting action which starts at one side of the web and continues to the other side.

The two rolls are preferably of relatively small diameter, so that they may be started and stopped easily, and so the position of each cut may be precisely regulated.

The operation of the cutting blade is such that as soon as the cut is completed, the cutting blade is retracted once more, so that the upstream end of the web can continue passing between the rolls without obstruction.

The various features of novelty which characterize the invention are pointed out with more particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

Figure 1:
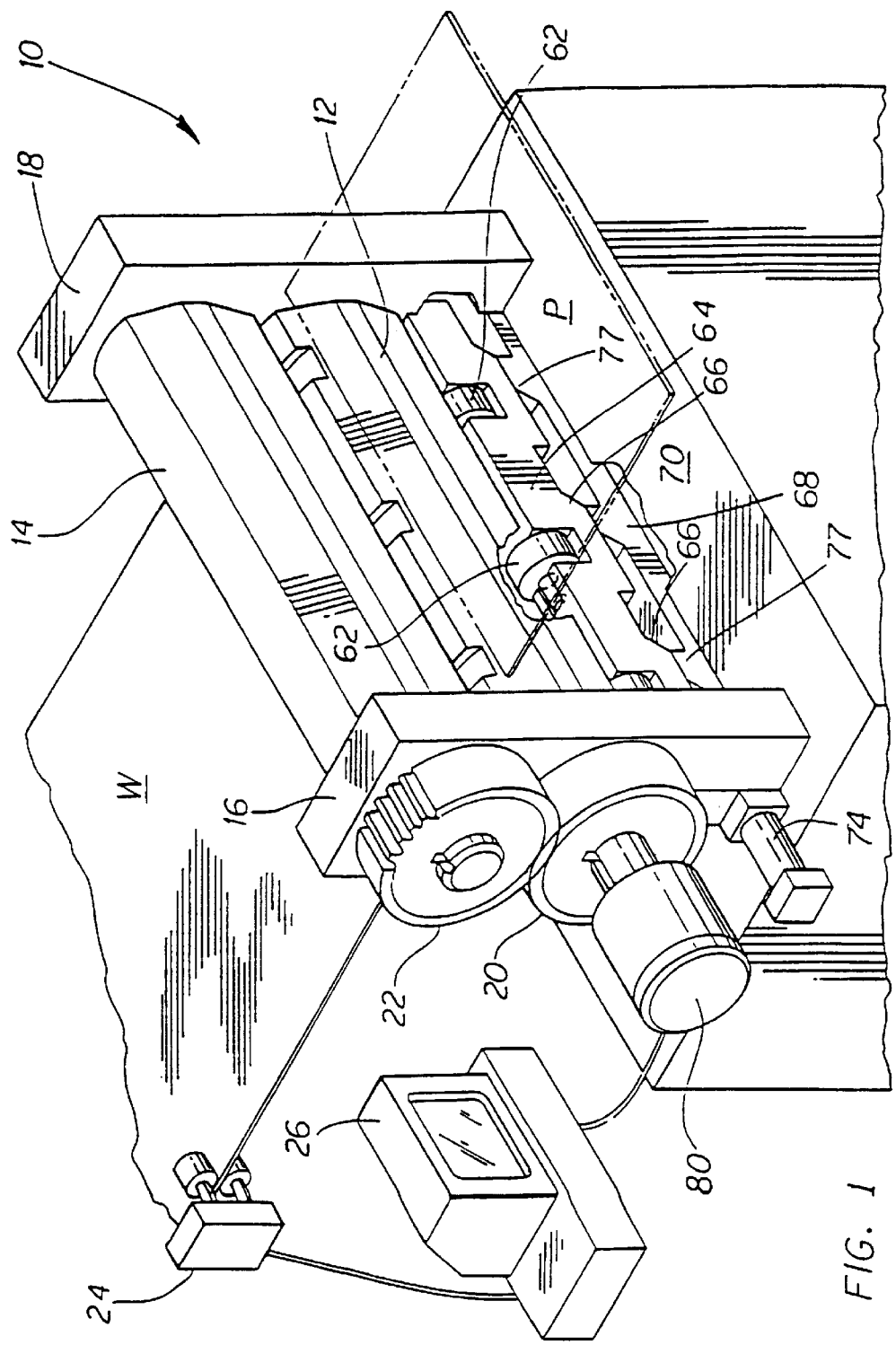
FIG. 1 is a perspective illustration of a rotary cutoff apparatus illustrating the invention, and showing a web work piece in phantom.

Referring first of all to FIG. 1, it will be seen that this illustrates a cutoff apparatus indicated generally as 10, used in conjunction with a web work piece indicated as W, for cutting off a cut to length piece indicated as P.

Typically, the cutoff apparatus will be located in conjunction with an with an operating line, incorporating a typical web uncoiler, for supporting a roll of web material, and which may or may not incorporate tensioners, straighteners, flatteners, all such as are well known in the web forming art. These pieces of equipment are typical in the metal web art. However, in conjunction with other materials, the cutoff apparatus may be used in a variety of other locations, where the web material is fed in flat sheets or where the web material is a non-metallic material.

The purpose of the cutoff apparatus is to cut a leading piece P of the web away from the remainder of the web, while the web is moving continuously at a relatively high speed, so that the piece P may be used or formed or sold or otherwise disposed of. The piece P must be cut to a precise predetermined length. A requirement of the apparatus is that it must readily be controllable and adjustable so that the piece P can be cut to any desired length, and that it may be varied from cut to cut, if required.

The cutoff apparatus consists, in part, of lower and upper rolls 12 and 14, mounted between stands 16 and 18, linked together for operation in unison by gears 20 and 22.

Upstream of the rolls 12 and 14, there is located a length sensing device 24, which may be connected to a suitable central processing unit 26, for generating a length signal. The CPU 26 will be controllable so as to deliver a cut signal after a predetermined length of web has been measured. The lengths of the pieces W to be cut off may be programmed into the CPU, in a well-known manner.

The upper roll 14 in this embodiment of the invention has a generally oval shape in section, in which the two apexes 28 and 30 have a smooth semi-cylindrical surface. Mounted at apex 28 there is a stop bar 32, the purposes of which will be described below.

The stop bar 32 defines a smooth shearing surface 34, which is radial with respect to the centre of the roll, and terminates in an edge.

The bar 32 is mounted in a generally right angular recess 36 formed in apex 28 and is releasably secured by bolts 38 so that it may be removed for reworking from time to time. Alongside the shearing surface 34 apex 28 is formed with a flattened portion 40 for reasons to be described below.

The lower roll 12, in this embodiment, is also of generally oval shape in section and defines apexes 42 and 44 which are of smooth semi-cylindrical shape. However, roll 12 is formed with a central diametrical slot 45 extending along the length of the roll, to a predetermined depth in the roll. Connecting with the diametrical slot, there are, in this embodiment, three diametrical bores, represented in section by numeral 46 in FIG. 3, extending therethrough from the slot, and opening to the opposite side of the roll. Within the slot there is a moveable cutting blade 52, which can be slid out of and into the slot 45. The blade 52 is mounted in this case, on three operating rods 54, extending through the three bores 46. The rods are formed with unillustrated collars, which act as locating stops.

Within the bores, there are located return springs 58, which function to urge the rods into their retracted position, thereby retracting the blade 52 back into the slot 45.

At the free ends of each of the rods 54, there is provided a cam shoulder 60. The cam shoulders are designed to ride on respective cam rollers 62. Cam rollers 62 are rotatably mounted at spaced intervals along a sliding cam bar 64 (FIG. 5), which is located below the lower roll, in this embodiment. The cam bar is formed with three operating ramps 66. A slideable control bar 68 is movably secured to a base 70, to which the stands 18 and 20 are also secured. Bolts 72 extend through slotted openings (not shown) in bar 68 and permit it to be slid to and fro (FIG. 5). An operating cylinder 74 is mounted on base 70 and has a piston rod 76 connected to bar 68. Ramps 77 on bar 68 engage rams 66 on bar 64. Cylinder 74 may be powered by any suitable means and operates to move bar 68 to and fro relative to cam bar 64.

Movement in one direction will raise cam bar 64 upwardly, and movement in the other direction will allow cam bar 64 to move downwardly. Such movement of cam bar 64 will cause rollers 62 to either engage with, or disengage from, cam shoulders 60.

In operation as the lower roll rotates, the cams will engage the shoulders and drive the rods through the lower roll and thereby extending the blade from the slot. As the lower roll continues to rotate, the cams will drop off the shoulders and the springs will retract the rods and the blade.

Figure 3:
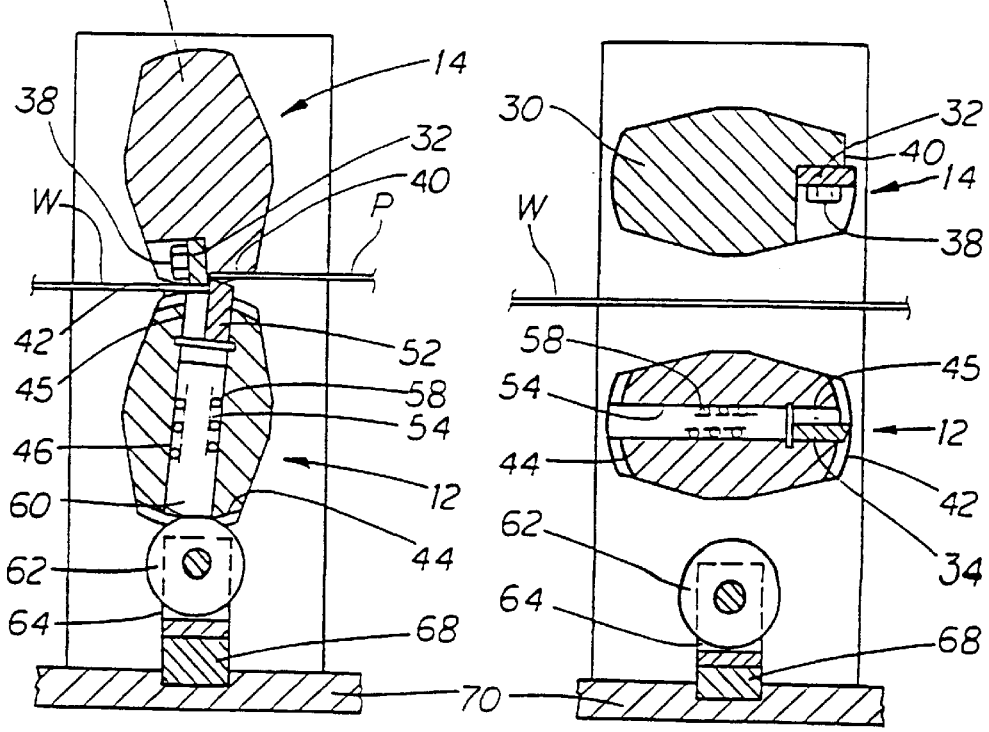
FIG. 3 is a section corresponding to FIG. 2, but showing the two rolls rotated and showing the cutting action of the cutting blade.
Figure 4:
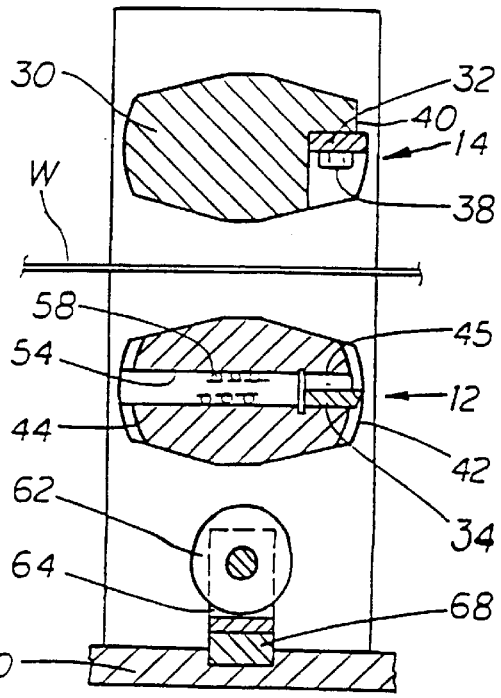
FIG. 4 is a section corresponding to FIG. 3 but showing the position of the rolls rotated 90 degrees, and stopped, just after completion of a cut, and, FIG. 5 is a front elevation of the cutoff apparatus illustrating the invention.

The position and location of the gears is such that the blade and the stop bar, respectively on the lower roll and the upper roll register with one another at a predetermined location on opposite sides of the web (FIG. 3). As the cams drive the blade out of the slot, the blade will slide alongside the smooth radial cutting surface of the stop bar, thereby providing a shearing action. As will be noted from FIG. 4, the cutting blade is slightly angled from one side to the other so as to provide a progressive cutting from one side of the web to the other.

In order to operate and start and stop the rolls, any power operated means that is suitable may be used. FIG. 1 shows a DC motor 80 which can be started and stopped by signals from the CPU. This is a simple and highly effective means for operating the cutoff rolls. However in some cases it may be desirable to use a combination clutch and brake mechanism, or in some cases a clutch alone, such as are well known in the art and require no description. Upon the receipt of a cut signal from the CPU 26, the power means will operate and thereby rotating the gears.

Figure 2:
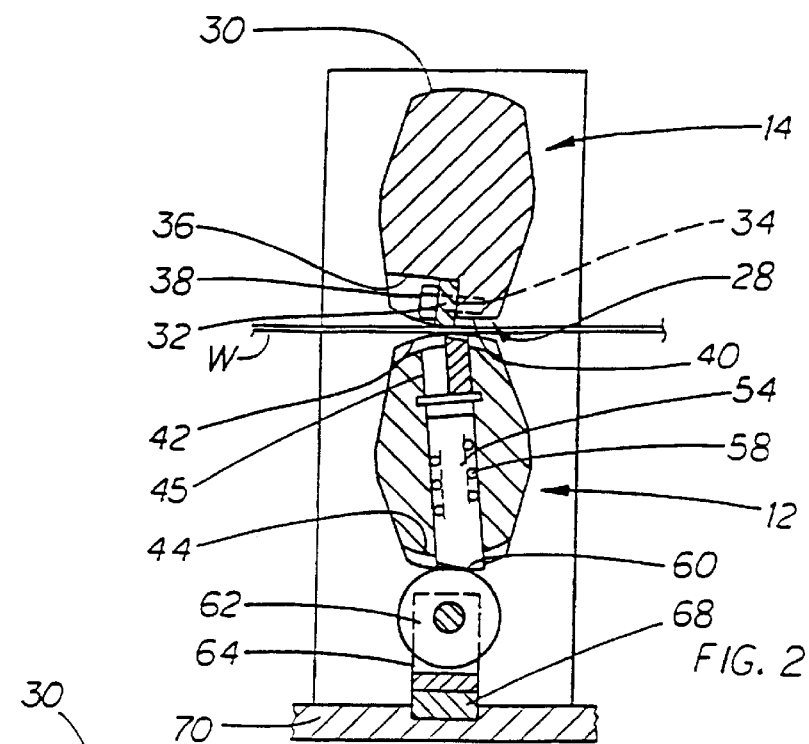
FIG. 2 is a section along the line 2—2 of FIG. 1, showing the two rolls inactive with the web work piece passing therebetween.

Within a predetermined brief period of time, after the rolls have rotated and the cut has taken place, the power is discontinued and the rolls will stop, thereby allowing the web to continue passing between the rolls unobstructed. The rolls may be stopped in the position of FIG. 2, and the workpiece will be free to pass therethrough. Alternatively the rolls may be stopped in the position of FIG. 4 with the two rolls rotated 90 degrees past the cutting point.

The rolls may be operated intermittently in this way in many cases. In other cases the rolls may be rotated continuously at a predetermined reduced speed. In this case the cylinder is operated so as to drop the cam bar, and prevent operation of the cutting bar. The web can continue to pass between the rolls without obstruction, even though they are rotating since the spacing between the rolls is enough to allow the web to pass. Upon receipt of a cut signal the cylinder will operate so as to move the slide bar and raise the cam bar upwardly. This will cause the cam rollers to rise and engage the cam shoulders, thereby causing a cut stroke.

The method of operation of the cutting device is self evident from the foregoing description.

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. An apparatus for cutting a moving sheet of web material into predetermined lengths as said web moves along a predetermined web movement axis, said apparatus including a pair of lower and upper cutoff rolls defining a gap there between for movement of the sheet of web material there through, one of the rolls having a moveable cutoff blade for cutting the web and having means for operating said lower and upper rolls in unison to thereby rotate the same in unison, said apparatus further comprising:

a fixed stop bar mounted in a fixed position on one of said lower and upper rolls, defining a cutoff location;

said moveable cutoff blade on the other of said lower and upper rolls;

a blade connecting means extending through said other of said rolls;

an operating means located outside said other of said rolls and capable of contacting said blade connecting means, whereby rotation of said other of said rolls causes said operating means to contact said blade connecting means to advance said cutoff blade towards said stop bar, said cutoff blade being offset with respect to said stop bar whereby said cutoff blade moves adjacent said fixed stop bar and achieves a shearing action cutting said web material;

a slide means located adjacent to but spaced from said other of said rolls, said slide means being moveable in an engaging direction and a disengaging direction along a slide axis transverse to said web movement axis;

a ramp means connected to said slide means, whereby operation of said slide means along said slide axis in said engaging direction causes said ramp means to move said operating means into contact with said blade connecting means thereby moving said blade towards said web to make a cut, and operation of said slide means along said slide axis in said disengaging direction causes said ramp means to move said operating means out of contact with said blade connecting means to allow said blade to move away from said web; and a power operated means for selectively moving said slide means in said engaging direction and said disengaging direction.

2. A cutoff apparatus as claimed in claim 1 and including means for starting and stopping the cut off rolls by means of power operated means connected to a length measurement device located upstream of the cutoff apparatus, for measuring the length of the web material and for sending signals to the power operated means.

3. A cutoff apparatus as claimed in claim 1 wherein the cutoff blade is mounted at a shear angle relative to the stop bar, so as to provide a cutting action which starts at one side of the web and continues to the other side.

4. A cutoff apparatus as claimed in claim 1 wherein said two rolls are a predetermined diameter, so that they may be started and stopped, and so the position of each cut may be precisely regulated.

5. A cutoff apparatus as claimed in claim 1 wherein, as soon as the cut is completed, the cutoff blade is released, so that the upstream end of the web can continue passing between the rolls without obstruction.

6. A cutoff apparatus as claimed in claim 1 wherein said rolls are of generally oval shape in section, and define two apexes, and said stop bar being located at one apex of one said roll, and a slot and said blade being located at an apex of the other said roll.

7. A cutoff apparatus as claimed in claim 2 including through openings extending diametrically through said other roll and said connecting means comprising rods being located in said through bores and means biasing said rods into a position in which said rods are retracted within said roll.

8. A cutoff apparatus as claimed in claim 7 and wherein said one roll defines a right angular shoulder at one apex, and fastening means securing said stop bar to said shoulder, whereby said stop bar is removable for servicing.

9. A method of cutting a moving sheet of web material as said web material moves along a predetermined web movement axis, and for cutting the same into predetermined lengths by passing said sheet of web material through a pair of lower and upper cutoff rolls the rolls defining a gap there between for movement of the sheet of web material there through, and wherein a moveable cutoff blade is connected to a blade connecting means extending through said other of said rolls, an operating means located outside said roll for operating said blade connecting means, said operating means being mounted on a mounting means, a slide means moveable relative to said operating means, and ramp means whereby movement of said slide means in a direction transverse to said web movement axis will operate said operating means, and power operated means for moving said slide means between two positions, said method comprising the steps of:

intermittently operating said lower and upper rolls whereby to rotate the same in unison, there being a stop bar on one of said lower and upper rolls, defining a cutoff location and a moveable cutoff blade on the other of said lower and upper rolls, whereby said operating means causes said blade connecting means to advance said cutoff blade towards said stop bar, said cutoff blade being offset with respect to said bar whereby said cutoff blade moves adjacent said bar and achieves a shearing action cutting said web material, and;

starting and stopping the cutoff rolls by means of a power operated means connected to a length measurement device located upstream of the cutoff apparatus, for measuring the length of the web material and for sending signals to the power operated means, and operating said slide means in timed relation to operation of said rolls thereby causing engagement of said operating means with said blade connecting means to move said cutoff bar towards said stop bar and procure shearing of said web.

\* \* \* \* \*